July 7, 1964

V. V. JOHNSON 3,140,102

RELEASABLE FLUID LINE COUPLING

Filed Nov. 23, 1962

INVENTOR.
V. V. JOHNSON

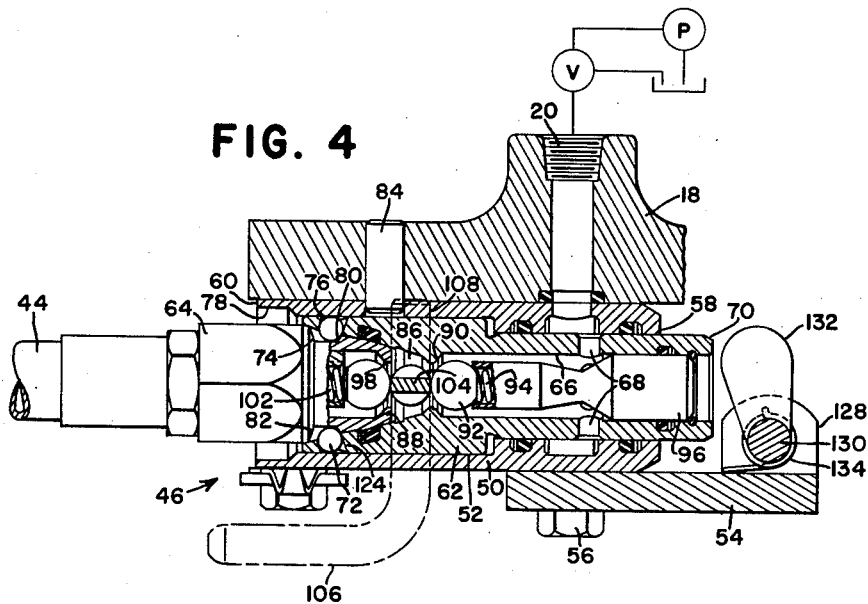
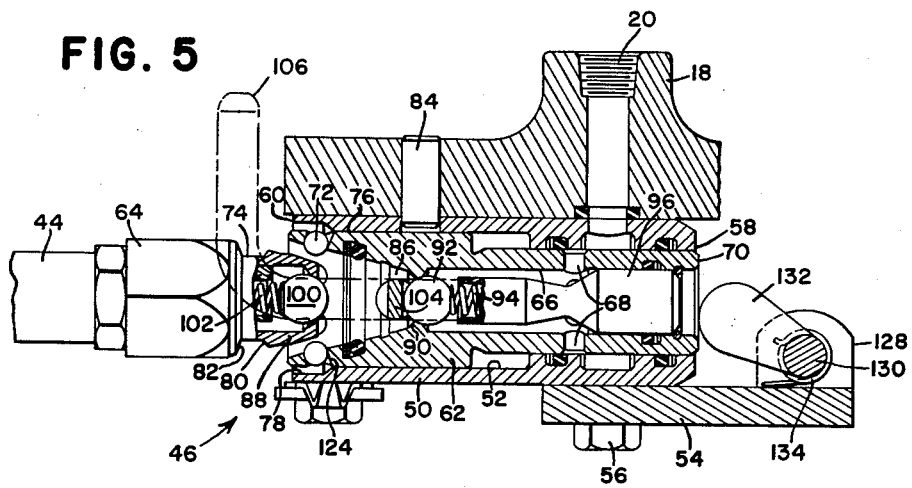

United States Patent Office 3,140,102
Patented July 7, 1964

3,140,102
RELEASABLE FLUID LINE COUPLING
Vernon V. Johnson, Faulkton, S. Dak., assignor of one-half to Erwin H. Gebhart, Faulkton, S. Dak.
Filed Nov. 23, 1962, Ser. No. 239,653
9 Claims. (Cl. 280—421)

This invention relates to a releasable fluid line coupling adapted primarily for use in a tractor-trailer or tractor-implement organization in which the tractor has a hydraulic power lift system for supplying fluid under pressure to a hydraulic device on the trailer or implement.

In a typical situation of the character noted above, it often occurs that the implement or trailer becomes accidentally disconnected from the tractor, with the result that the flexible hydraulic conduit connected between the tractor and implement or trailer becomes damaged unless some form of releasable coupling is provided in the hydraulic line. Releasable couplings of this general nature are, of course, well known, and several forms thereof are extant in the prior art. Most of these operate on the principle of male and female parts normally interconnected by releasable means which are capable of separation in response to a predetermined tensional force applied to the hose line. A commercially acceptable releasable means comprises an annular row of balls confined in a retainer and controlled by a collar or the like so that in the normal or connected position of the coupling parts the balls are forced into an annular groove. Upon shifting of the coupling parts in response to tensional or disconnecting forces, the row of balls moves into an enlarged area so that they can escape radially outwardly from the annular groove, thus permitting disconnection of the coupling parts.

In addition to the problems involved in disconnection in response to accidental separation of the tractor and implement or trailer, certain problems are associated with deliberate manual disconnection of the parts, because of the frictional and hydraulic forces involved. Therefore, it is desirable to have some form of coupling that is readily releasable in all circumstances but at the same time will possess sufficient connection characteristics so as to resist separation in response to forces below a predetermined value.

According to the present invention, an improved form of releasable coupling is provided, together with means for applying a force thereto in such manner as to facilitate separation, both in response to accidental and deliberate forces. It is a significant object of the invention to recognize that the forces involved in actuating the release means are different when tensional forces are applied to the rear coupling part from compression forces applied to the forward coupling part, it having been discovered that the cam angles in the annular groove acting on the balls attribute to this difference. Moreover, hydraulic forces in the system at the time are often high enough to prevent expedient separation of the coupling parts.

It is a further object of the invention to utilize means other than the flexible fluid conduit—in the main—for transmitting forces to the coupling parts. That is to say, in the conventional system in which tensional force applied primarily through the hose is relied upon to effect separation, it is found that the hose stretches and consequently reduces its diameter, with a resultant increase in hydraulic pressure because of the smaller cross-sectional area. According to the present invention, tensioning means is connectible between the hose and/or the implement so as to relieve the hose mainly from the primary tensioning forces.

It is a further object of the invention to utilize force-multiplying means so as to facilitate separation of the coupling parts.

A further object is to provide mechanism of the character described which may be readily attached to hydraulic coupling systems already in existence.

The foregoing and other important objects and desirable features inherent in and encompassed by the invention will become apparent as a preferred embodiment thereof is disclosed, by way of example, in the ensuing description and accompanying sheets of drawings, the figures of which are described below.

FIG. 4 is a slightly enlarged section as seen along the line 4—4 of FIG. 2.

FIG. 5 is a view similar to FIG. 4, but showing the parts in disconnected condition.

Figure 1:
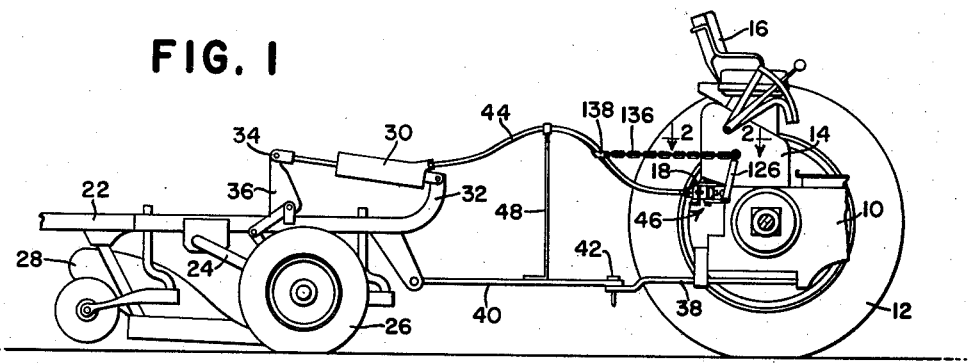
FIG. 1 is a representative tractor-implement organization, with portions of the tractor and implement omitted in the interests of simplicity and clarity.

The tractor chosen for purposes of illustration may be regarded as typical of any of the well known agricultural tractors and has a main body or casing 10 carried on front and rear wheels, only one of the latter of which is shown at 12. An upper rear portion of the casing 10 carries a seat support 14 on which is mounted an operator's seat 16. The seat support 14 encloses the main portions of a hydraulic power lift system, which may be of the type disclosed in the patent to Kienzle 2,974,734. A portion of this system includes a housing part or support 18 having a high-pressure fluid passage 20, appropriately connected to the system as by means of a pump P and valve V (FIG. 4). Since these may vary within rather wide limits, the details are considered of no patentable moment and therefore further illustration is deemed to be unnecessary.

The implement or trailing unit selected as illustrative is a plow 22 having a cranked axle 24 and ground wheel 26 which is exploited for the purpose of raising and lowering the plow bottom 28 through the medium of a fluid device, here a cylinder and piston assembly 30, connected at one end to a portion 32 of the plow beam and having its piston connected at 34 to a bell crank and linkage system 36 which in turn is connected to the cranked axle and wheel assembly 24-26. It will be seen that extension and retraction of the fluid device 30 raises and lowers the plow bottom 28.

The implement is connected in trailing relationship to the tractor via a draft means including a tractor drawbar 38, a plow tongue 40 and a separable connection such as a clevis pin 42.

Fluid under pressure is transmitted from the tractor hydraulic system to the fluid device 30 by means of a flexible conduit or hose line 44, which at its front end is connected to the hydraulic system by means of a coupling indicated in its entirety by the numeral 46. As is generally conventional, the length of the hose 44 is greater than the fore-and-aft distance between the coupling means 46 and the fluid device 30, and it is therefore desired to resiliently support the excess portion of the hose as by a support 48. It is a characteristic of the support 48 that in the event of disconnection of the tractor and implement, as by accidental breakage of the clevis pin 42, the support will yield as the hose 44 straightens out because of the tension applied thereto. A typical example of a support of this character is shown in the patent to Oehler 2,626,552.

The foregoing may be regarded as generally typical of what has gone before in the art; that is to say, it shows a tractor-implement or tractor-trailer organization separably connected by draft means such as 38-40-42 and wherein the tractor has a hydraulic power lift system connected by a flexible conduit, as at 44, to a fluid device, as at 30, on the implement, the structure taking into consideration the fact that the draft means may accidentally separate so that tensional forces are applied to the conduit 44, requiring therefore that the coupling 46 be of a releasable type.

In the present case the coupling 46 is mounted on the support 18 which, as previously described, is part of the mechanical structure of the power lift system. The coupling includes a carrier 50 provided with a fore-and-aft bore 52 which in this case is of circular cross section, ignoring, for the moment, counterbores. The carrier is rigidly mounted on the support part 18 through the provision of additional supporting elements such as a bracket 54, mounted by cap screws or the like at 56.

The afore-and-aft disposition of the carrier 50 and the bore 52 therein mean that the carrier has open front and rear ends 58 and 60 respectively, thus enabling the carrier to coaxially mount for axially shifting therein front and rear coupling parts 62 and 64 respectively. The normal or operating position of the coupling parts is shown in FIG. 4, wherein it will be seen that a front coupling part 62, being tubular at 66, is hydraulically connected to the tractor power lift system via the passage 20 and radial passages 68 in the annular wall that affords the tubular structure. In its front, normal or operating position, the forward end of the front coupling part 62 is exposed or projects at the front end 58 of the carrier 50 as at 70, and the rear end of this coupling part is enlarged and provided with an annular row of circular openings which carries an annular row of locking balls 72 which, in the interconnected status of the two coupling parts 62 and 64, are receivable by an annular groove 74 in the rear coupling part 64. The portion of the bore 52 of the carrier 50 is, in the area of the balls 72, of such configuration, as at 76, as to confine the balls normally to the groove 74, thus releasably interconnecting the two coupling parts for axial shifting in unison from the front position shown in FIG. 4 to what may be regarded as a rear position, at least for the front coupling part 62, as shown in FIG. 5. When the two coupling parts shift to the rear position, the annular row of balls 72 becomes radially alined with an enlarged counterbore 78 at the rear end 60 of the carrier 50, whereby the balls 72 are allowed to have radial outward movement, effected by a front annular cam surface 80 which borders the annular groove 74 in the coupling part 64. In other words, a rearward force exerted on the hose 44, for example, will cause the coupling parts to shift rearwardly in unison until the balls 72 are in radial register with the counterbore 78, whereupon continued movement causes the balls to cam outwardly so that the coupling part 64 releases axially rearwardly from the front coupling part 62. Appropriate stop means, to be described later, limits rearward movement of the front coupling part so that it remains within the carrier 50 while the rear coupling part 64 continues rearwardly with the hose 44.

The rear face of the groove 74 is provided by an annular surface 82. That the carrier 50 is fixed against axial movement relative to the support 18 is evident from the pin 84.

Just ahead of a rear socket 86 in the rear end of the front coupling part 62 which receives the front end 88 of the rear coupling part 64, the front coupling part has a valve seat 90 controlled by a ball valve 92 which in turn is spring loaded at 94 via a plug 96 which closes the front end 70 of the coupling part 62 but which is necked down to permit the passage of fluid from the high pressure passage 20 through the rear end of the coupling part past the ball 92 and valve seat 90 when the ball is open. A valve seat 98 in the front end 88 of the rear coupling part 64 is likewise controlled by a valve ball 100, spring loaded at 102 to close the seat against the passage of fluid from one coupling part to the other when the coupling parts are separated. However, in the normal or connected or operating positions of the coupling parts (FIG. 4) the balls 92 and 100 are held off their seats by an intervening cam 104 controlled externally by an operating member 106. This member is shown in full lines in FIGS. 2 and 3 but since it would be eliminated from the sections in FIGS. 4 and 5 it is shown in dot-dash lines to facilitate an understanding of its operation.

Figure 2:
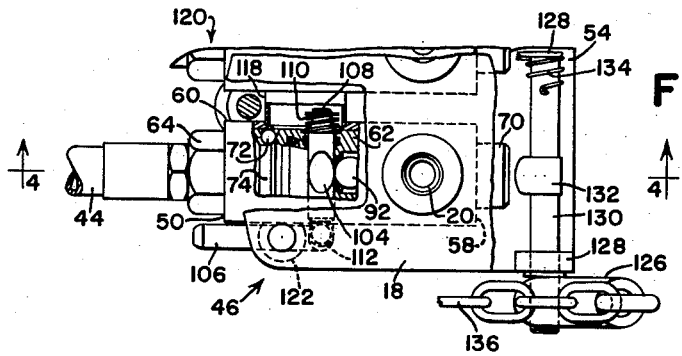
FIG. 2 is an enlarged view, partly in section, as seen generally along the line 2—2 of FIG. 1.

The cam 104 is formed on the operating member 106 as an intermediate portion of a transverse shaft 108 which is biased in one direction (upwardly as seen in FIG. 2) by a spring 110 so that a cylindrical portion of the member 106, as at 112 (FIGS. 2 and 3) is engageable with a partially cylindrical groove 114 in the side of the carrier which affords a detent action tending normally to retain the handle 106, and consequently the cam 104, in the position shown in FIGS. 1–4. The shaft portion 108 extends diametrically through the front coupling part 62 and diametrically opposed portions of the carrier 50 are slotted, as at 116, so as to provide limited movement of the shaft as it moves with the front coupling part. When the shaft 108 reaches the rear end of the slot 116, it affords the aforesaid stop for limiting rearward movement of the front coupling part so that it cannot escape completely rearwardly from the carrier 50. In the area in which the shaft 108 extends to receive the spring loading at 110, the carrier is provided with an enclosure sleeve 118 (FIG. 2), which, in some cases, may serve the dual function of enclosing not only the spring 110 on the shaft 108 but a similar spring on a similar shaft which is provided in a mated or paired coupling means suggested generally at 120. In such cases, there will be two hose lines running between the tractor and the implement. Since such would be but a duplication of what has already been described and what will be described below, the two coupling means have not been completely illustrated. Suffice it to say, however, that what is true of the coupling means 46 will also be true of the coupling means 120 and its components.

When the coupling parts are in their forward or operating positions (FIGS. 1–4) the forward end 70 of the front coupling part 62 will project as shown, and the operating member 106 will be so disposed that its portion 112 is upright, the shaft 108 being at the forward end of the carrier slots 116 and the cam 104 being disposed as to positively hold the balls 92 and 100 in their open positions so that fluid transfer through the coupling parts is available. This means that opening and closing of the valve V will effect transmission and nontransmission of fluid between the tractor hydraulic system and the fluid device 30 on the implement.

Assuming now that the draft connection between the tractor and implement accidentally separates, tensioning force will be applied to the hose 44 so as to cause the coupling parts to shift in unison from the position of FIG. 4 to a position short of that of FIG. 5, meaning that the front coupling part will shift to its rear position as determined by the stop effected between the shaft 108 and the rear end of the slot 116 in the carrier 50. As this motion occurs, the upper end of the operating member 106 engages a depending stop 122 on the support 18, causing the portion 112 to become free of the detent action at 114 so that the member 106 turns 90° in a clockwise direction (compare FIGS. 4 and 5). When this occurs, the cam 104 is turned so that its two diametrically opposed low portions respectively face the coupling part valves 92 and 100, whereupon these two balls are closed by their respective springs 94 and 102, thus preventing loss of fluid from the coupling parts. At the same time, it is expected that the coupling parts, moving into the area in which the balls 72 can escape at the counterbore 78, will effect release of the releasable means constituted by the balls 72 and their cooperating groove 74 so that the coupling part 64 can escape rearwardly. In the tensioning of the hose 44, the support 48 will yield so that the hose may straighten. After separation, the support 48 will regain its position so as to restore the loop in the hose and thereby elevate the hose so that the disconnected coupling part 64 will not contact the ground and therefore will not accumulate dirt and other foreign matter.

The coupling parts may be reconnected, following other corrective measures, by reinserting the front end 88 of the rear coupling part 64 into the rear socket 86 of the front coupling part 62 while the latter is in the position of FIG. 5. Since the valves 92 and 100 are closed, the effects of hydraulic pressure will not be felt. When the rear coupling part is inserted into the front coupling part socket 60 so that the balls 72 are in register with the groove 74, the two coupling parts are moved forwardly in unison, the balls then being confined by the annular area or counterbore 76 so that the two coupling parts are reconnected. Thereafter, the operating member 106 may be manually turned 90° in a counterclockwise direction so as to open the balls 92 and 100.

The foregoing finds many of its counterparts already existent in the prior art; that is to say, it is not new to provide a pair of coupling parts shiftable in unison through a predetermined extent so that locking means such as the balls 72 and groove 74 will cooperate to release the rear coupling part; nor is it novel to provide an operating handle similar to that at 106. However, the construction is typical of many that have gone before in that release of the coupling parts is not as simple as has been described. For one thing, separation will usually occur when hydraulic pressure is being transmitted through the hose lines, which means that hydraulic forces are present and must be overcome by the separating force. It has already been described that when tensioning forces are applied directly to the conduit, such as that shown here at 44, a reduction in cross sectional area will result, bringing about an increase in hydraulic pressure, thus increasing the difficulty of easily separating the coupling parts. For another thing, it will be noted that the angle of the annular cam 80 is such as to force the balls 72 radially outwardly into contact with the annular area or counterbore 76. This results in considerable frictional forces which are not easily overcome. It should be noted also that each of the bores that carries a ball 72 is inclined inwardly and rearwardly, in each case affording another cam surface, designated here at 124. These parts are so designed as to prevent unexpected or accidental separation of the coupling parts. Nevertheless, it is found by experience that these forces are not easily overcome.

According to the present invention, operating means is provided for effecting release of the coupling parts in a simple and expedient manner. Fundamentally, this is accomplished by exerting the rearward force on the front coupling part rather than on the rear coupling part. Looking now at FIG. 4, it will be seen that if a rearward force is exerted directly on the front coupling part 62 rather than on the rear coupling part 64, the cam angle of the ball bores at 124 will be acting on the balls and, since the balls are carried by the same part on which the cam angles 124 occur there will be no radial outward component, as distinguished from the component effective when the cam angle 80 on the rear coupling part acts against the balls. This eliminates a substantial amount of the frictional force to be overcome. It is also now readily apparent that if the tensional force is eliminated from the main part of the hose 44, there will be little reduction in cross sectional area of the hose, because stretching thereof is essentially eliminated.

The operating means provided, according to the present invention, for accomplishing the exertion of a rearward force directly on the front coupling part 62 as distinguished from a rearward pull on the rear coupling part 64 takes the form of a shiftable element or swinging lever 126 having means for mounting same on the tractor for fore-and-aft swinging or shifting. In this case, the bracket 54 is provided with a pair of transversely spaced apart ears or bearings 128 which journal a transverse rockshaft 130. This in turn is rigidly connected to the lower end of the lever 126. Intermediate its ends, the rockshaft 130 has rigidly affixed thereto a force-multiplying member in the form of a cam 132 which is normally disposed just ahead of the forwardly projecting or exposed end 70 of the front coupling part 62. It will thus be seen that when the lever or arm 126 is swung rearwardly, the cam 132 will be brought into engagement with the front end 70 of the front coupling part 62 so that a direct force-multiplied rearward force will be exerted against the coupling part, thus shifting the two coupling parts rearwardly to the rear position of the front coupling part so as to free the releasable means 72—74, whereby the rear coupling part 64 will become easily separated. A torsion spring 134 or other suitable biasing means may be utilized to return the lever 126 to its normal or forward position as illustrated in FIGS. 1-4.

For the purposes of facilitating manual connection and disconnection, the lever 126 is an expedient in and of itself. However, the invention goes further in providing force-transmitting means between the implement, or a portion thereof, and the lever 126 so that when a rearward force is exerted from the implement, as by disconnection of the draft means 38—40—42, this rearward force will be transmitted automatically to the lever 126 so as to effect disconnection of the coupling parts. In the present case, the force-transmitting means comprises a tension means in the form of a chain 136 connected in this instance at 138 to a forward portion of the hose 44. The forward end of the chain 136 has a releasable connection with the lever 126, here accomplished by providing the upper portion of the lever as a tubular part within which is received a telescopically disconnectible member in the form of an eye bolt 140 normally received in the position shown in FIGS. 1, 2 and 3. The connection of the chain 136 to the hose 44 at 138 is in effect a connection to the implement, since it removes a considerable portion of the tensional force from the hose 44, at least to the extent that the chain will be effective through the lever and cam system 126—132 to release the coupling means before any significant amount of tension is applied to the hose 44. When separation occurs, the lever 126 will of course swing through an angle of somewhat more than 90° so that the tubular part of the lever 126 becomes in effect substantially horizontal so that the eye bolt 140 may easily escape therefrom as the tractor continues forwardly ahead of the disconnected implement and disconnected coupling.

Figure 3:
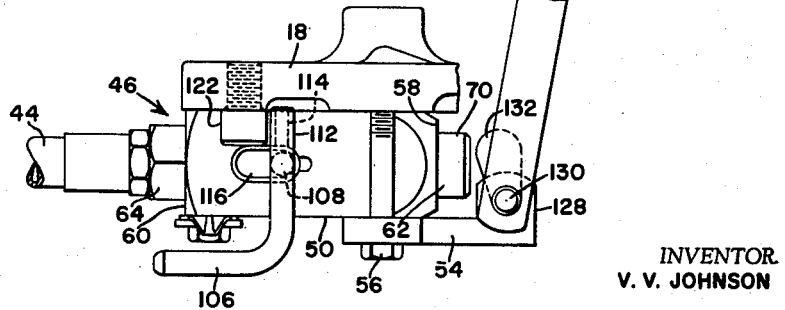
FIG. 3 is an elevational view of that portion of the structure shown in FIG. 3.

Upon reconnection of the tractor and implement, reconnection of the coupling parts may be easily effected in the manner previously described, it being evident that the spring 134 will return the lever 126 to its position of FIGS. 1, 2 and 3, and the eye bolt or member 140 may be reinserted in the tubular upper part of the lever 126, whereby the parts are conditioned for further operation. In other respects, the coupling parts function in conventional manner, which makes it clear that the force-multiplying means comprising the lever 126 and associated parts may be applied to other couplings of types generally similar to but specifically different from that described.

Features and advantages other than those enumerated will readily occur to those versed in the art, as will many modifications and alterations in the preferred embodiment disclosed, all without departure from the spirit and scope of the invention.

What is claimed is:

1. For a tractor having a hydraulic power lift system and a trailing implement separably connected to the tractor and including a hydraulic device having a flexible fluid conduit extending forwardly to the tractor: coupling means for connecting the tractor hydraulic system to the conduit, comprising a coupling carrier mounted on the tractor and having a fore-and-aft bore opening at front and rear ends; a front coupling part hydraulically connected to the tractor hydraulic system and coaxially carried in the carrier bore for axial shifting between front and rear positions and having a front portion exposed at the front opening of the carrier; a rear coupling part connected to the conduit and coaxially telescopically forwardly receivable by and rearwardly separable from the front part; releasable means interconnecting the coupling parts in the front position of said front part for rearward shifting in unison to the rear position of said front part and operative at said rear position to enable rearward separation of said rear part from said front part; a fore-and-aft shiftable element engageable with the front portion of the front coupling part; means movably mounting said element on the tractor; and tension means connected to said element and connectible to a portion of the implement to transmit a rearward force to said element, upon separation of the implement from the tractor, to shift said element rearwardly to act on said exposed portion of the front coupling part for shifting said coupling parts rearwardly relative to the carrier to the aforesaid rear position so as to release said rear part.

2. The invention defined in claim 1, including separable means between said element and the tension means operative to release the tension means from said element upon predetermined rearward shifting of said element.

3. The invention defined in claim 1, in which: said element is a swinging lever having a cam engaging said front portion of the front coupling part.

4. The invention defined in claim 3, in which: said lever is separably connected to the tension means for release thereof from said tension means upon predetermined rearward swinging of the lever.

5. For a tractor having a hydraulic power lift system and a trailing implement separably connected to the tractor and including a hydraulic device having a flexible fluid conduit extending forwardly to the tractor: coupling means for connecting the tractor hydraulic system to the conduit, comprising a coupling carrier mounted on the tractor and having a fore-and-aft bore opening at front and rear ends; a front coupling part hydraulically connected to the tractor hydraulic system and coaxially carried in the carrier bore for axial shifting between front and rear positions and having a front portion exposed at the front opening of the carrier; a rear coupling part connected to the conduit and coaxially telescopically forwardly receivable by and rearwardly separable from the front part; releasable means interconnecting the coupling parts in the front position of said front part for rearward shifting in unison to the rear position of said front part and operative at said rear position to enable rearward separation of said rear part from said front part; and means connectible to a portion of the implement and acting rearwardly on said front portion of the front coupling part to transmit a rearward force to said front coupling part upon separation of the implement from the tractor for shifting said coupling parts rearwardly relative to the carrier to the aforesaid rear position so as to release said rear part.

6. For a tractor having a hydraulic power lift system and a trailing implement separably connected to the tractor and including a hydraulic device having a flexible fluid conduit extending forwardly to the tractor: coupling means for connecting the tractor hydraulic system to the conduit, comprising a coupling carrier mounted on the tractor and having a fore-and-aft bore opening at front and rear ends; a front coupling part hydraulically connected to the tractor hydraulic system and coaxially carried in the carrier bore for axial shifting between front and rear positions and having a front portion exposed at the front opening of the carrier; a rear coupling part connected to the conduit and coaxially telescopically forwardly receivable by and rearwardly separable from the front part; releasable means interconnecting the coupling parts in the front position of said front part for rearward shifting in unison to the rear position of said front part and operative at said rear position to enable rearward separation of said rear part from said front part; a force-applying element; means mounting said element on the tractor for shifting between normal and release conditions; and force-multiplying means operative between said element and the front portion of the front coupling part for shifting said coupling parts rearwardly upon shifting of said element to its release condition.

7. The invention defined in claim 6, wherein said force multiplying means includes tension means connected to said element and connectible to a portion of the implement to transmit force to said element, upon separation of the implement from the tractor, to shift said element to said release condition.

8. For a tractor having a hydraulic power lift system and a trailing implement separably connected to the tractor and including a hydraulic device having a flexible fluid conduit extending forwardly to the tractor: coupling means for connecting the tractor hydraulic system to the conduit, comprising a coupling carrier mounted on the tractor and having a fore-and-aft bore opening at front and rear ends; a front coupling part hydraulically connected to the tractor hydraulic system and coaxially carried in the carrier bore for axial shifting between front and rear positions; a rear coupling part connected to the conduit and coaxially telescopically forwardly receivable by and rearwardly separable from the front part; releasable means interconnecting the coupling parts in the front position of said front part for rearward shifting in unison to the rear position of said front part and operative at said rear position to enable rearward separation of said rear part from said front part; a force-applying element; means mounting said element on the tractor for shifting between normal and release conditions; and force-multiplying means operative between said element and one of the coupling parts for shifting said coupling parts rearwardly upon shifting of said element to its release condition.

9. The invention defined in claim 8, wherein said force multiplying means includes: tension means connected to said element and connectible to a portion of the implement to transmit force to said element, upon separation of the implement from the tractor, to shift said element to said release condition.

References Cited in the file of this patent

UNITED STATES PATENTS

| | | |
|---|---|---|
| 2,511,765 | Bradbury | June 13, 1950 |
| 2,619,367 | Hanson | Nov. 25, 1952 |
| 2,662,784 | Livers | Dec. 15, 1953 |
| 2,858,848 | Writtren | Nov. 4, 1958 |
| 2,894,763 | Karnath | July 14, 1959 |
| 3,074,670 | Breumng | Jan. 22, 1963 |